Figure 1:
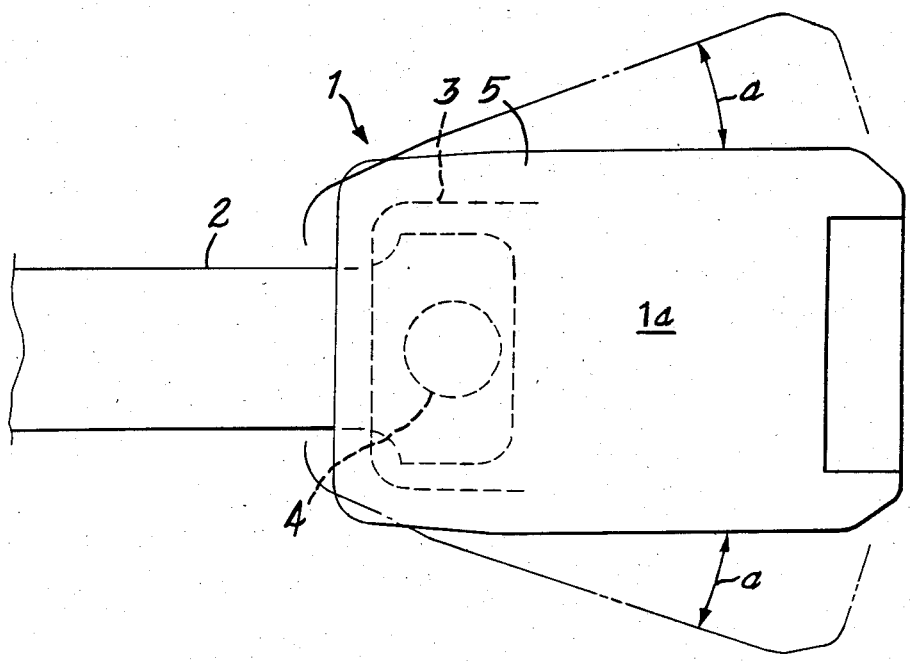

United States Patent [19]

Sasaki et al.

[11] Patent Number: 4,638,534
[45] Date of Patent: Jan. 27, 1987

[54] PIVOT STRUCTURE FOR SEAT BELT BUCKLE

[75] Inventors: Kiichi Sasaki, Saitama; Iimuro Takashi, Tokyo, both of Japan

[73] Assignee: Honda Giken Kogyo Kabushiki Kaisha, Tokyo, Japan

[21] Appl. No.: 777,615

[22] Filed: Sep. 19, 1985

[30] Foreign Application Priority Data

Sep. 19, 1984 [JP] Japan .................... 59-142087[U]

[51] Int. Cl.⁴ .................... A44B 11/00; A62B 35/00
[52] U.S. Cl. ............................ 24/683; 24/323; 24/639; 24/684; 280/801
[58] Field of Search ............... 24/683, 684, 639, 642, 24/653, 656, 616, 323; 280/801

[56] References Cited

U.S. PATENT DOCUMENTS

| | | | |
|---|---|---|---|
| 2,868,309 | 1/1959 | Burgess | 280/801 |
| 4,000,548 | 1/1977 | Stephenson et al. | 24/639 |
| 4,047,267 | 9/1977 | Lindblad | 280/801 |
| 4,199,190 | 4/1980 | Lindblad | 24/323 |
| 4,394,050 | 7/1983 | Spooner | 280/801 |
| 4,473,242 | 9/1984 | Weman | 280/801 |

FOREIGN PATENT DOCUMENTS 1409848  7/1965  France .................... 24/656

Primary Examiner—Victor N. Sakran
Attorney, Agent, or Firm—Lyon & Lyon

[57] ABSTRACT

Disclosed is a novel pivot structure for a seat belt buckle wherein a base plate of a seat belt buckle is connected to an anchor stay by way of a pin and spring means interposed therebetween in such a manner that the buckle may pivot relative to the anchor stay about the pin along the major surface of the anchor stay and, additionally, away from the major surface. The spring means biases the buckle toward a neutral position in which the buckle aligns with the axial line of the anchor stay. Thus, the seat belt buckle is maintained in a relatively rigid state relative to the anchor stay so that a tongue plate may be easily aimed and inserted thereinto. However, once the seat belt is securely fastened by the engagement of the tongue plate and the seat belt buckle, the buckle may pivot in any direction relative to the anchor stay and therefore will readily bend to conform to the body of the person wearing the seat belt and improve the comfort in wearing the seat belt.

5 Claims, 2 Drawing Figures

U.S. Patent    Jan. 27, 1987    4,638,534

PIVOT STRUCTURE FOR SEAT BELT BUCKLE

This invention relates to a buckle for fastening a seat belt by engagement with a tongue plate attached to an end of a fabric belt, and in particular to a pivot structure for such a seat belt buckle which is supported by a substantially rigid anchor stay.

For the purpose of improving the ease of fastening a seat belt, a buckle is sometimes securely attached to an anchor stay made of substantially rigid material which is in turn securely attached to the floor of the vehicle body while a tongue plate which is to be engaged with the buckle is attached to an end of a fabric seat belt. It may substantially facilitate the fastening of the seat belt, for instance allowing the seat belt to be fastened only by one hand, since the buckle is supported in a substantially rigid manner, but, on the other hand, it may not properly conform to the human body and may not give enough comfort to the passenger or the driver, as the case may be.

An anchor stay which is flexible to a certain extent, for instance by being made of twined steel wires, has been in existence, but it can only partially solve the problem because aiming the tongue plate into the buckle may become difficult if the anchor stay is too flexible and the wearing comfort may be impaired if the anchor stay is too rigid whereby the seat belt cannot conform to the human body. Furthermore, if the anchor stay is flexible to a certain extent, it may remain positioned above the seat after the passenger has left the seat and thereby obstruct the motion of the seat back when the seat back is inclined forwardly for admitting a passenger into the rear part of the passenger compartment in the case of a two-door passenger car.

In view of such shortcomings of the prior art, a primary object of this invention is to provide a pivot structure for a seat belt buckle which facilitates the fastening of the seat belt.

Another object of this invention is to provide a pivot structure for a seat belt buckle which allows the seat belt to readily conform to the wearer of the seat belt.

Yet another object of this invention is to provide a pivot structure for a seat belt buckle which does not obstruct a seat back when the seat back is folded over the seat cushion.

According to this invention, such objects are accomplished by providing a pivot structure for a seat belt buckle which is supported on a free end of a substantially rigid anchor stay, wherein: a base plate of the seat belt buckle is connected to a free end of the anchor stay by way of a pin in such a manner that the base plate may rotate about the pin along a plane of a major surface of the free end of the anchor stay and may incline relative to the major plane, and the base plate is biased by spring means towards a position in which the base plate aligns with an axial line of the anchor stay.

Figure 2:
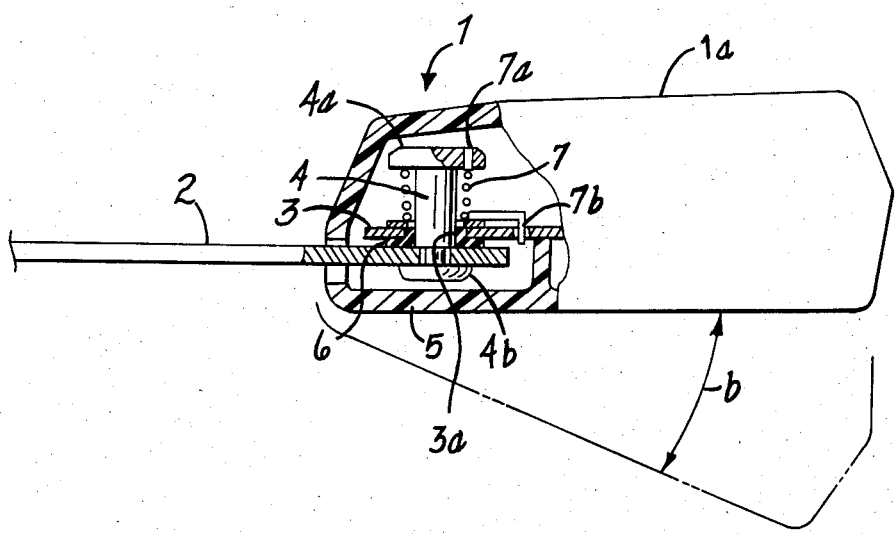

Other objects, features and advantages of the present invention will become apparent from the following description of a preferred embodiment of this invention with reference to the appended drawings, in which:

FIG. 1 is a schematic front view of a seat belt buckle incorporating a pivot structure according to this invention; and FIG. 2 is a partially broken-away plan view of the seat buckle of FIG. 1.

In FIGS. 1 and 2, the free end of an anchor stay 2 which is made of a strip of metal plate and is substantially rigid, is pivotably connected to a base plate 3 of a seat belt buckle 1 by a pin 4, with the major surfaces of the anchor stay 2 and the base plate 3 parallel to and closely spaced from each other. The pin 4 is securely attached to the anchor plate 2 by crimping an end of the pin 4 in the manner of a rivet as indicated by numeral 4b. The other end of the anchor stay 2 is securely attached to a floor of the vehicle body not shown in the drawings. A hole 3a in the base plate 3 for receiving the pin 4 has an inner diameter which is substantially greater than the outer diameter of the pin 4, and a bushing 6 made of suitable synthetic resin is interposed between the outer circumference of the pin 4 and the inner circumference of the hole 3a of the base plate 3 in order to avoid metal-to-metal contact between the pin 4 and the base plate 3. The bushing 6 is preferably of an outwardly facing "C" shaped cross-section for engaging the hole 3a and providing a flange on each side of the base plate 3. The lower flange of bushing 6 is positioned between and slightly separates the anchor stay 2 and base plate 3.

The other end of the pin 4 is provided with a flange 4a. A compression coil spring 7 is fitted over the pin 4 between the flange 4a and the bushing 6 and engages the upper flange of bushing 6. One end 7a of the coil spring 7 is engaged in a small hole in the flange 4a of the pin 4 while the other end 7b is engaged in a small hole in the base plate 3.

Thus, the base plate 3, which carries the latch mechanism (not shown in the drawings) of the seat belt buckle 1 and its outer casing 1a made of synthetic resin, is not only pivotably connected to the anchor stay 2 about the axis of the pin 4, but also is biased by the coil spring 7 towards the neutral position shown in solid lines in FIG. 1. The seat belt buckle 1 can pivot about the pin 4 in both directions as shown by the arrows a in FIG. 1 and tends to return to a neutral position in which the anchor stay 2 and the buckle 1 are aligned along a straight central line of each component. Furthermore, since the base plate 3 may move along the pin 4 against the compression spring force of the coil spring 7 and the inner diameter of the hole in the bushing 6 mounted in the hole 3a of the base plate 3 that receives the pin 4 is substantially greater than the outer diameter of the pin 4, the buckle 1 may be pivoted or bent from the major plane of the free end of the anchor stay 2 as indicated by the arrow b shown in FIG. 2. As a result, a universal connection is formed between the anchor stay 2 and buckle 1.

In summary, according to this seat belt buckle invention, since the seat buckle 1 aligns with the anchor stay 2 in natural state, engagement of a tongue plate (not shown in the drawings) to this buckle 1 is facilitated. Once the tongue plate is engaged to the buckle 1, the buckle 1 may bend relative to the anchor stay 2 and may pivot about the pin 4 against the spring force of the coil spring 7, whereby the buckle will readily assume an orientation or direction for the seat belt to conform to the contour of the wearer of the seat belt and improve the wearer's comfort.

Although the present invention has been described in terms of the specific embodiment, it will readily appear to those skilled in the art that it is possible to modify the structure of various parts of the invention without departing from the spirit of the invention. For instance, a pair of spring members may be provided for separately producing the restoring forces for the pivoting motion and the bending motion, respectively, of the base plate 3 relative to the anchor stay 2. And, as an alternative embodiment, the pin 4 may be securely attached to the base plate 3 and passed through a hole provided in the free end of the anchor stay 2.

The invention claimed is:

1. Pivot structure for a seat belt buckle which is supported on a free end of a substantially rigid anchor stay, wherein: a base plate of the seat belt buckle is connected to a free end of the anchor stay by way of a pin in such a manner that the base plate is rotatable about the pin along a plane of a major surface of the free end of the anchor stay and is free to incline relative to the major plane, the base plate is biased by spring means towards a position in which the base plate aligns with an axial line of the anchor stay, and said spring means comprises a coil spring fitted over the pin with one end of the coil spring engaged to the pin while the other end of the coil spring is engaged to the base plate.

2. Pivot structure for a seat belt buckle as defined in claim 1, wherein the pin is securely attached to the free end of the anchor stay and a hole in the base plate receiving the pin has an inner diameter which is substantially greater than the outer diameter of the pin.

3. Pivot structure for a seat belt buckle as defined in claim 2, wherein a bushing made of synthetic resin is interposed between the outer circumference of the pin and the hole in the base plate.

4. Pivot structure for a seat belt buckle as defined in claim 3, wherein the anchor stay is made of a strip of metal plate.

5. Pivot structure of claim 3, wherein said bushing is of an outwardly facing C-shape to engage the hole in the base plate and provide a flange portion on each side of the base plate.

* * * * *